Feb. 3, 1970    G. LACROUX    3,493,799
ROTOR FOR RELUCTANCE MOTORS
Filed Nov. 20, 1967
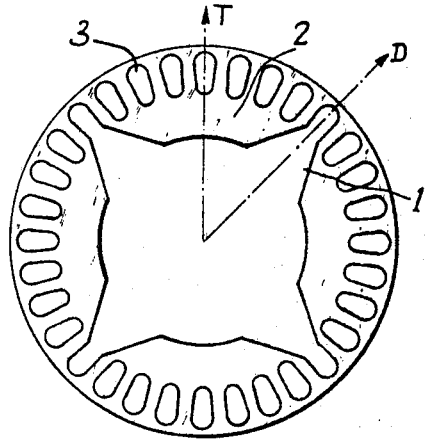
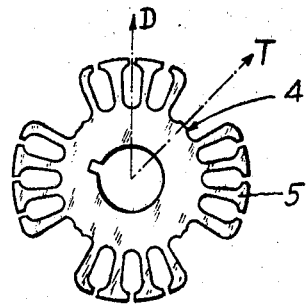
INVENTOR
GERARD LACROUX United States Patent Office 3,493,799
Patented Feb. 3, 1970

3,493,799
ROTOR FOR RELUCTANCE MOTORS
Gérard Lacroux, Chatenay-Malabry, France, assignor to Etablissements E. Ragonot, Malakoff, France, a French company
Filed Nov. 20, 1967, Ser. No. 684,403
Claims priority, application France, Nov. 23, 1966, 84,634
Int. Cl. H02k 1/08
U.S. Cl. 310—166                    5 Claims

ABSTRACT OF THE DISCLOSURE

A rotor for a reluctance motor wherein the laminations are provided in registry with the axis of each direct flux with an opening so as to reduce to a maximum the amount of magnetic material in the path of the transverse flux, while said laminations are provided with an inwardly projecting bulge between th successive openings, in registry with the axis of each transverse flux to afford a passage of maximum reluctance for the direct flux. This arrangement allows giving the laminations an accurate circular peripheral outline.

---

The present invention has for its object improvements in reluctance motors. Such motors are generally constituted by an asynchronous squirrel cage motor of which the rotor is provided with notches defining salient poles. Said arrangement leads to obtaining a minimum reluctance for the direct flux passing through the gap in registry with the poles, the reluctance being at a maximum for the transverse flux passing through the gap in registry with the notches.

This arrangement shows unavoidably however various drawbacks. As a matter of fact, since a fraction only say about two thirds of the polar pitch is used, the idle current is larger than when the poles are of the non-salient type. Furthermore, the machining of the rotor becomes a difficult matter by reason of the presence of notches at its periphery. Lastly, the power of such reluctance motors is defined by the ratio between the reluctances associated with the transverse flux and with the direct flux. It has been proposed, it is true, to cut slots in the laminations forming the rotor armature. Said slots extend in parallelism with the magnetic lines of the direct flux, that is in substantial parallelism with the edges of the notches so that the transverse lines of flux may pass perpendicularly through said slots. This structure is comparatively complex and brittle and therefore its execution is a difficult matter.

The present invention has for its object to cut out such drawbacks and to produce a rotor for a reluctance motor, which is of an easy execution and assembly. The rotor for a reluctance motor according to the invention is novel inasmuch as the laminations forming the rotor are cut out so as to show an opening inside each angular sector registering with the axis of the direct flux and an inwardly facing bulge on each angular sector registering with the axis of a transverse flux, the peripheral outline of said laminations being circular so that the lines of force of the direct flux pass only through said bulges while the lines of force of the transverse flux pass through the openings in the laminations.

In the accompanying drawings illustrating by way of example an embodiment of the invention:

FIG. 1 illustrates a four-pole rotor lamination cut in accordance with said embodiment.

FIG. 2 illustrates as prior art a rotor the four poles of which are salient ones.

Turning to FIG. 2, it is apparent that the lamination of the rotor including four salient poles is provided with a notch 4 in each angular sector corresponding to the axis T of a transverse flux and salient poles 5 in each angular sector corresponding to the axis D of a direct flux.

In the case of FIG. 1, the peripheral outline of the lamination is circular. The lamination is provided in each angular sector corresponding to the axis D of a direct flux with an opening cut along any desired outline and in each angular sector corresponding to the axis T of a transverse flux with a bulge 2. The conventional slots have been illustrated at 3 and it has been assumed for sake of simplicity that the openings 1 open each into one of the slots.

In such an arrangement, the bulges 2 in the rotor form the magnetic circuit for the direct fluxes, while the transverse fluxes pass through the openings 1 the shape of which is designed so as to constrain said flux to pass to a maximum outside magnetic material.

The cutting out of the laminations as illustrated provides inter alia the possibility of obtaining a rotor having a peripheral outline made of a homogeneous material, which leads to an easy machining of the rotor.

What I claim is:

1. A rotor for a reluctance motor subject to a plurality of direct and transverse fluxes and comprising a number of laminations, each of said laminations having a continuous circular periphery and a centrally arranged open space, each of said laminations divided into a number of first angular sectors with each first angular sector disposed about the axis of a direct flux and a number of second angular sectors with each second angular sector disposed about the axis of a transverse flux, each of the first angular sectors having an opening through said laminations located on the axis of the direct flux therein and extending outwardly from the open space therethrough, each of the second angular sectors having a projection on said lamination located on the axis of the transverse flux and extending inwardly into the open space therethrough, and a plurality of angularly spaced closed slots extending through each of said laminations spaced outwardly from the open space and inwardly from the continuous circular periphery of said laminations.

2. A rotor as set forth in claim 1, wherein the openings in the first angular sectors extend outwardly into said slots located on the axes of the direct flux within the first angular sectors.

3. A rotor for a reluctance motor subject to a plurality of direct and transverse fluxes and comprising a number of laminations, each of said laminations having a continuous circular periphery and a centrally arranged open space, each of said laminations divided into a number of first angular sectors with each first angular sector disposed about the axis of a direct flux and a number of second angular sectors with each second angular sector disposed about the axis of a transverse flux, each of the first angular sectors having an opening through said lamination located on the axis of the direct flux therein and extending outwardly from the open space therethrough, each of the second angular sectors having a projection on said lamination located on the axis of the transverse flux and extending inwardly into the open space therethrough, the centrally arranged open space having a four-sided configuration with the axes of the direct flux bisecting the corners thereof and with the axes of the transverse flux bisecting each side thereof, the openings in the first angular sectors symmetrically disposed about the axes of the direct flux, the projections in the second angular sectors symmetrically disposed about the axes of the transverse flux, and an annular ring of angularly spaced radially extending closed slots extending through said laminations and disposed outwardly from the open space and inwardly from the continuous circular periphery of said laminations.

4. A rotor as set forth in claim 3, wherein the openings in the first angular sectors extend outwardly into the radially extending slots located on the axes of the direct flux and forming therewith a continuous open passage.

5. A rotor as set forth in claim 4, wherein the sides of the openings are in diverging relationship inwardly from the point of intersection with the slot to the point of intersection with the projections on the opposite sides of the axes of the direct flux.

References Cited

UNITED STATES PATENTS

| | | | |
|---|---|---|---|
| 2,520,020 | 8/1950 | Sollosy | 310—211 |
| 2,913,607 | 11/1959 | Douglas | 310—261 |
| 2,975,310 | 3/1961 | Armstrong | 310—211 |
| 3,012,161 | 12/1961 | Puder | 310—261 |
| 3,047,755 | 7/1962 | Angst | 310—261 |
| 3,068,374 | 12/1962 | Bekey | 310—261 |
| 3,210,584 | 10/1965 | Jorgensen | 310—211 |

MILTON O. HIRSHFIELD, Primary Examiner

R. SKUDY, Assistant Examiner

U.S. Cl. X.R.

310—211, 264